(12) United States Patent
Hsieh

(10) Patent No.: US 9,072,078 B2
(45) Date of Patent: Jun. 30, 2015

(54) METHOD AND MOBILE COMMUNICATION SYSTEM CAPABLE OF ESTABLISHING PEER-TO-PEER TRANSMISSION

(75) Inventor: Cheng-Ying Hsieh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 179 days.

(21) Appl. No.: 13/288,969

(22) Filed: Nov. 4, 2011

(65) Prior Publication Data

US 2012/0210008 A1 Aug. 16, 2012

(30) Foreign Application Priority Data

Feb. 14, 2011 (TW) .............................. 100104759 A

(51) Int. Cl.
*G06F 15/16* (2006.01)
*H04W 76/02* (2009.01)
*H04L 29/12* (2006.01)

(52) U.S. Cl.
CPC ........... *H04W 76/02* (2013.01); *H04L 61/1535* (2013.01); *H04L 61/2007* (2013.01)

(58) Field of Classification Search
CPC  H04W 76/02; H04L 61/2007; H04L 61/1535
USPC ............................... 709/223–230, 249; 713/1
See application file for complete search history.

(56) References Cited

U.S. PATENT DOCUMENTS

2003/0221009 A1* 11/2003 Standridge et al. ........... 709/227
2004/0037269 A1   2/2004 Lundin
2004/0054781 A1*  3/2004 Chen et al. .................... 709/227
2004/0148406 A1*  7/2004 Shima .......................... 709/228
2005/0220134 A1* 10/2005 Lin ............................... 370/437
2005/0251577 A1* 11/2005 Guo et al. ..................... 709/230

(Continued)

FOREIGN PATENT DOCUMENTS

EP          2 160 051 A1      3/2010
EP          2160051 A1        3/2010
WO          2008004153 A2     1/2008

OTHER PUBLICATIONS

Ford (Ford, Bryan, Peer-to-Peer Communication Across Network Address Translators, 2005, USENIX Association, 2005 USENIX Annual Technical Conference, pp. 179-192).*
Srisuresh et al. (Srisuresh, P., RFC 5128 State of Peer-to-Peer (P2P) Communication across Network Address Translators (NATs), Mar. 2008, Network Working Group, pp. 1-32).*

(Continued)

*Primary Examiner* — Brian J Gillis
*Assistant Examiner* — Michael A Keller
(74) *Attorney, Agent, or Firm* — Winston Hsu; Scott Margo

(57) ABSTRACT

A method for establishing peer-to-peer (P2P) transmission in a mobile communication system includes a first mobile station requesting the mobile communication system for a first Internet Protocol (IP) address and transmitting a message to a second mobile station to indicate the second mobile station to trigger the P2P transmission when the first mobile station starts to establish the P2P transmission with the second mobile station, the second mobile station requesting the mobile communication system for a second IP address according to the message, the first and second mobile stations updating receiving statuses of the first and second IP addresses to a server device, and the server device outputting information of the second IP address to the first mobile station after the first and second mobile stations obtain the first and second IP addresses, to allow the first mobile station to establish the P2P transmission with the second mobile station accordingly.

6 Claims, 3 Drawing Sheets

(56) References Cited

U.S. PATENT DOCUMENTS

| | | | |
|---|---|---|---|
| 2007/0288656 A1* | 12/2007 | Liang et al. | 709/245 |
| 2008/0002698 A1* | 1/2008 | Pantalone et al. | 370/392 |
| 2008/0123685 A1* | 5/2008 | Varma et al. | 370/466 |
| 2008/0192756 A1* | 8/2008 | Damola et al. | 370/400 |
| 2008/0279133 A1* | 11/2008 | Bienfait et al. | 370/315 |
| 2009/0222450 A1* | 9/2009 | Zigelman | 707/10 |
| 2010/0118831 A1* | 5/2010 | Chen et al. | 370/331 |
| 2010/0281180 A1* | 11/2010 | Iyer | 709/234 |
| 2010/0293240 A1* | 11/2010 | Lee et al. | 709/206 |
| 2011/0082941 A1* | 4/2011 | Kim et al. | 709/227 |
| 2011/0103261 A1* | 5/2011 | Duan | 370/254 |
| 2011/0134028 A1* | 6/2011 | Hiroshima et al. | 345/156 |
| 2011/0153850 A1* | 6/2011 | Akabane et al. | 709/228 |
| 2011/0252151 A1* | 10/2011 | Lu et al. | 709/228 |
| 2012/0087302 A1* | 4/2012 | Chaturvedi et al. | 370/328 |
| 2012/0157123 A1* | 6/2012 | Li et al. | 455/456.2 |

OTHER PUBLICATIONS

Guha et al. (Guha, S., RFC 5382 NAT Behavioral Requirements for TCP, Oct. 2008, Network Working Group, pp. 1-22).*

3rd Generation Partnership Project; Technical Specification Group Services and System Aspects; General Packet Radio Service (GPRS); Service description; Stage 2 (Release 9), 3GPP TS 23.060 V9.3.0 (Dec. 2009), cover page + p. 180-182.

Office action mailed on Aug. 20, 2013 for the Taiwan application No. 100104759, filing date: Feb. 14, 2011, p. 1 line 12-14, p. 2-3, p. 4 line 1-2 and search report.

Office action mailed on Mar. 3, 2014 for the China application No. 201110047653.1, p. 3 line 5-31, p. 4-5 and p. 6 line 1-8.

3GPP TS 23.060 V9.3.0 (Dec. 2009), "3rd Generation Partnership Project; Technical Specification Group Services and System Aspects; General Packet Radio Service (GPRS); Service description; Stage 2 (Release 9)", cover page and pp. 180-182.

* cited by examiner

METHOD AND MOBILE COMMUNICATION SYSTEM CAPABLE OF ESTABLISHING PEER-TO-PEER TRANSMISSION

BACKGROUND OF THE INVENTION

1. Field of the Invention

The present invention relates to a method and mobile communication system capable of establishing peer-to-peer (P2P) transmission, and more particularly, to a method and mobile communication system capable of implementing P2P transmission to enhance data transmission rate and transmission throughput.

2. Description of the Prior Art

In a general packet radio service (GPRS) and a universal mobile telecommunication system (UMTS), each network application (e.g. VoIP, WAP, etc.) corresponds to an individual access point name (APN). Prior to starting a network application, a mobile station (MS), i.e. a user equipment, must activate a packet data protocol (PDP) context activation procedure between a serving GPRS support node (SGSN) and a service providing gateway GPRS support node (GGSN). A PDP context contains routing information for a packet in GPRS/UMTS network. When a PDP context activation procedure is triggered, the SGSN chooses a suitable APN to serve the user according to a service activated by the mobile station, and then seeks a suitable GGSN to serve the user. The SGSN can query a domain name server (DNS) according to the corresponding APN, to provide a set of suitable GGSN addresses. The SGSN then chooses a GGSN to start establishing the PDP context. In other words, triggering the PDP context activation procedure also means allocating an Internet protocol (IP) address to the mobile station.

Generally, there is a finite amount of IP addresses, especially for mobile communication systems, since users often far exceed allocable addresses. Therefore, mobile communication system suppliers employ dynamic host configuration protocol (DHCP) techniques, to dynamically allocate IP addresses. In other words, a system allocates an IP address to a mobile station requiring a network service, and recycles the IP address when the mobile station is turned off or when the network service is terminated. If the mobile station subsequently requires another network service, the system reallocates another IP address. As such, IP addresses may be reused to reduce wastage of network resources.

As can be seen from the above, whenever the mobile station is turned off or the network service is terminated, allocated IP addresses are recycled, and mobile stations do not have fixed IP addresses. As such, it is difficult for a mobile station to establish a P2P transmission, or other similar data connections with another mobile station. Therefore, it is necessary to improve over the prior art.

SUMMARY OF THE INVENTION

Therefore, the present invention primarily provides a method and mobile communication system capable of establishing P2P transmission.

The present invention discloses a method for establishing P2P transmission in a mobile communication system, including requesting the mobile communication system for a first Internet Protocol (IP) address and transmitting a message to a second mobile station by a first mobile station to indicate the second mobile station to trigger the P2P transmission when the first mobile station starts to establish the P2P transmission with the second mobile station; requesting the mobile communication system for a second IP address by the second mobile station according to the message; updating receiving statuses of the first IP address and the second IP address to a server device by the first mobile station and the second mobile station; and outputting information of the second IP address by the server device to the first mobile station after the first mobile station obtains the first IP address and the second mobile station obtains the second IP address, to allow establishing of the P2P transmission with the second mobile station by the first mobile station accordingly.

The present invention further discloses a mobile communication system, including a network; a plurality of mobile stations; and a server device, for storing an IP address and device information of the plurality of mobile stations; wherein a first mobile station of the plurality of mobile stations requests the network for a first IP address, and transmits a message to a second mobile station to indicate the second mobile station to trigger a P2P transmission when the first mobile station starts to establish the P2P transmission with the second mobile station; the second mobile station requesting the network for a second IP address according to the message; the first mobile station and the second mobile station updating receiving statuses of the first IP address and the second IP address to the server device; and the server device transmitting information of the second IP address to the first mobile station after the first mobile station obtains the first IP address and the second mobile station obtains the second IP address, to allow the first mobile station to establish the P2P transmission with the second mobile station accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
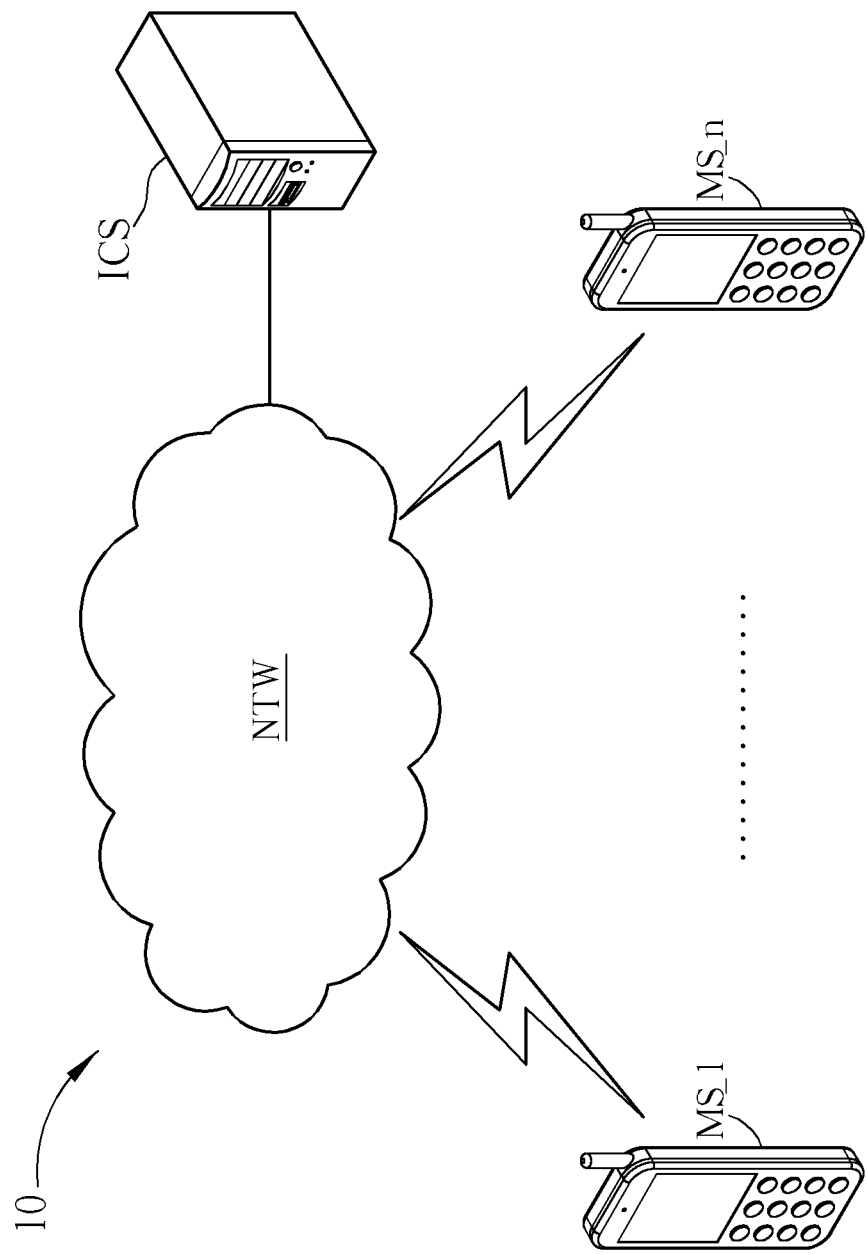
FIG. 1 is a schematic diagram of a mobile communication system according to an embodiment of the present invention.

Please refer to FIG. 1, which is a schematic diagram of a mobile communication system 10 according to an embodiment of the present invention. The mobile communication system 10 can be UMTS or any other long-distance mobile communication system, primarily including a network NTW, mobile stations MS_1-MS_n and a server device ICS. The network NTW represents all devices or equipments for implementing network functionalities in the mobile communication system 10, contents of which may differ for different systems. In an example of UMTS, the network NTW includes a core network, base station (Node B), radio network controller, etc. The mobile stations MS_1-MS_n are user equipments, e.g. cell phones, smart phones, notebook computers, etc. The server device ICS is used for storing IP addresses and device information of the mobile stations MS_1-MS_n, such that the mobile communication system 10 can implement a P2P transmission.

Figure 2:
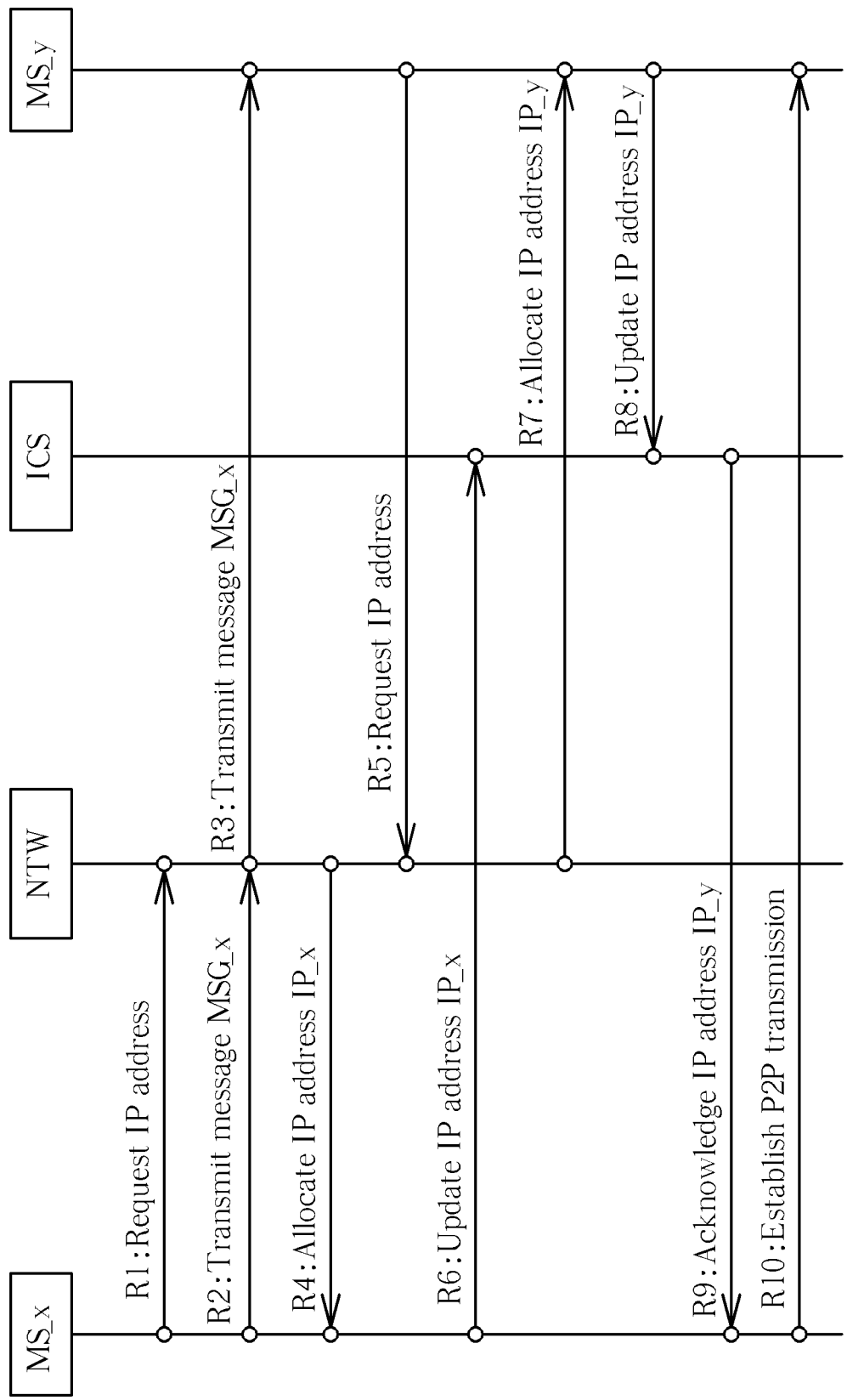
FIG. 2 is a schematic diagram of a mobile station in the mobile communication system shown in FIG. 1 establishing a P2P transmission with another mobile station.

Please further refer to FIG. 2 for operations of the mobile communication system 10 implementing the P2P transmission. FIG. 2 is a schematic diagram of a mobile station MS_x establishing a P2P transmission with a mobile station MS_y in the mobile communication system 10. For conciseness, signal transmissions between the mobile station MS_x, the mobile station MS_y, the network NTW and the server device ICS are simplified and represented by paths R1-R10 in FIG. 2. First, after a user of the mobile station MS_x starts to establish the P2P transmission with the mobile station MS_y, the mobile station MS_x requests the network NTW for an IP address via the path R1. If the network NTW allocates an IP address IP_x to the mobile station MS_x, then the network NTW acknowledges the mobile station MS_x of an allocation result via the path R4, and the mobile station MS_x transmits information of the IP address IP_x to the server device ICS via the path R6. Additionally, the mobile station MS_x transmits a message MSG_x to the mobile station MS_y through the network NTW via the paths R2 and R3, to indicate the mobile station MS_y to trigger the P2P transmission. After receiving the message MSG_x, the mobile station MS_y requests the network NTW for an IP address via the path R5. If the network NTW allocates an IP address IP_y to the mobile station MS_y, then the network NTW acknowledges the mobile station MS_y of an allocation result via the path R7, and the mobile station MS_y transmits information of the IP address IP_y to the server device ICS via the path R8. Finally, the server device ICS transmits the information of the IP address IP_y of the mobile station MS_y to the mobile station MS_x via the path R9, such that the mobile station MS_x can establish the P2P transmission with the mobile station MS_y via the path R10.

Simply put, when the mobile station MS_x intends to establish a P2P transmission with the mobile station MS_y, besides first obtaining an IP address, the mobile station MS_x further indicates the mobile station MS_y to obtain an IP address through the message MSG_x. After the mobile stations MS_x and MS_y both obtain IP addresses, the server device ICS acknowledges the mobile station MS_x of IP address IP_y of the mobile station MS_y. Accordingly, the mobile station MS_x may directly connect to the mobile station MS_y to realize the P2P transmission.

In a conventional mobile communication system, due to a finite amount of usable IP addresses, mobile stations utilize dynamic address allocation. Moreover, whenever mobile stations turn off or network services are terminated, the allocated IP addresses are recycled; thus, P2P transmission cannot be realized. Comparatively, the mobile communication system 10 of the present invention adds the server device ICS, which timely updates IP addresses and device information of the mobile stations MS_1-MS_n, and also acknowledges a mobile station (i.e. MS_x) of an IP address of a target mobile station (i.e. MS_y) when the mobile station triggers P2P transmission, such that a data connection may be successfully established between the two.

Note that, FIGS. 1 and 2 are utilized to illustrate the concept of the present invention, and any modifications made accordingly are within the scope of the present invention. For example, if the mobile communication system 10 is UMTS, then the paths R1 and R5 in FIG. 2 represent the PDP context activation procedure, the message MSG_x may be a short message, and the device information of the mobile stations MS_1-MS_n stored by the server device ICS may contain a mobile station integrated services digital network number (MSISDN) or other information capable of identifying the mobile stations MS_1-MS_n. Additionally, to prevent connection errors, a termination mechanism may be added. For example, the mobile station MS_x should terminate establishing of the P2P transmission with the mobile station MS_y when any of the following occurs:

1. The mobile station MS_x fails to transmit the message MSG_x to the mobile station MS_y due to network problems or because the mobile station MS_y is not powered on;
2. The mobile station MS_x fails to obtain the IP address IP_x;
3. The mobile station MS_x fails to receive the information of the IP address IP_y transmitted by the server device ICS within a predefined time.

The three above-mentioned scenarios merely serve illustrative purposes, and are not intended to pose limitations. Other scenarios, e.g. the mobile station MS_y refuses a connection request by the mobile station MS_x, etc., may also be included in the termination mechanism.

Figure 3:
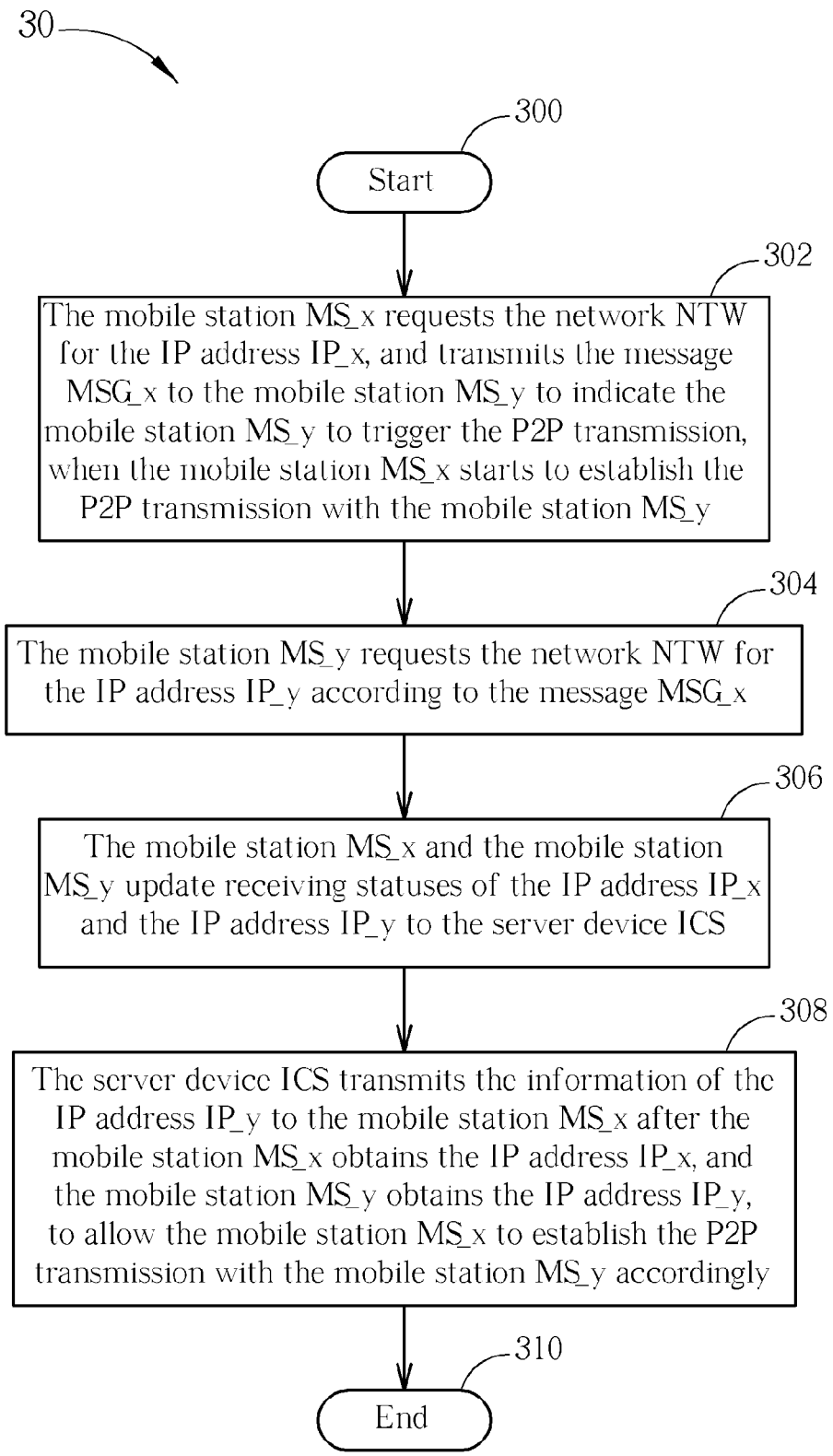
FIG. 3 is a schematic diagram of a process according to an embodiment of the present invention.

Operations of the mobile communication system 10 may be further summarized into a process 30, as shown in FIG. 3. The process 30 includes the following steps:

Step 300: Start.

Step 302: The mobile station MS_x requests the network NTW for the IP address IP_x, and transmits the message MSG_x to the mobile station MS_y to indicate the mobile station MS_y to trigger the P2P transmission, when the mobile station MS_x starts to establish the P2P transmission with the mobile station MS_y.

Step 304: The mobile station MS_y requests the network NTW for the IP address IP_y according to the message MSG_x.

Step 306: The mobile station MS_x and the mobile station MS_y update receiving statuses of the IP address IP_x and the IP address IP_y to the server device ICS.

Step 308: The server device ICS transmits the information of the IP address IP_y to the mobile station MS_x after the mobile station MS_x obtains the IP address IP_x, and the mobile station MS_y obtains the IP address IP_y, to allow the mobile station MS_x to establish the P2P transmission with the mobile station MS_y accordingly.

Step 310: End.

Detailed descriptions and modifications of the process 30 can be found in the aforementioned, and are not reiterated herein.

In a conventional mobile communication system, owing to a finite amount of usable IP addresses, mobile stations utilize dynamic address allocation. Moreover, allocated IP addresses are recycled whenever mobile stations are turned off or network services are terminated; thus, P2P transmission cannot be realized. Comparatively, the mobile communication system of the present invention transmits information of the IP addresses of the mobile stations such that data connections may be successfully established between the mobile stations.

In summary, the mobile communication system of the present invention allows mobile stations to implement P2P transmission and to enhance data transmission rate and transmission throughput.

Those skilled in the art will readily observe that numerous modifications and alterations of the device and method may be made while retaining the teachings of the invention.

What is claimed is:

1. A method for establishing peer-to-peer (P2P) transmission in a mobile communication system being a universal mobile telecommunication system comprising a network, a first mobile station, a second mobile station and a server device, the method comprising:

the first mobile station requesting the network for a first Internet Protocol (IP) address via a first packet data protocol (PDP) context activation procedure and transmitting a message to the network for indicating to the second mobile station to trigger the P2P transmission when the first mobile station starts to establish the P2P transmission with the second mobile station;

the network transmitting the message received from the first mobile station to the second mobile station;

the second mobile station requesting the network for a second IP address via a second PDP context activation procedure according to the message received from the network, wherein the second IP address is available to a third mobile station before the second mobile station acquires the second IP address in order to save network resources;

the first mobile station and the second mobile station updating receiving statuses of the first IP address and the second IP address to the server device according to reception of the first IP address and the second IP address; and the server device actively outputting information of the second IP address to the first mobile station after the receiving statuses updated by the first mobile station and the second mobile station indicates that the first mobile station has obtained the first IP address and the second mobile station has obtained the second IP address, to allow establishing of the P2P transmission with the second mobile station by the first mobile station accordingly.

2. The method of claim 1, further comprising terminating establishing of the P2P transmission with the second mobile station by the first mobile station when the first mobile station fails to transmit the message to the second mobile station, or fails to obtain the first IP address, or fails to receive the information of the second IP address outputted by the server device within a predefined time.

3. The method of claim 1, wherein the message transmitted by the first mobile station is a short message.

4. A mobile communication system being a universal mobile telecommunication system, comprising:
   a network;
   a plurality of mobile stations; and
   a server device, for storing an Internet Protocol (IP) address and device information of the plurality of mobile stations;

wherein a first mobile station of the plurality of mobile stations requests the network for a first IP address via a first packet data protocol (PDP) context activation procedure, and transmits a message to the network to indicate to the second mobile station to trigger a peer-to-peer (P2P) transmission when the first mobile station starts to establish the P2P transmission with the second mobile station; the network transmits the message received from the first mobile station to the second mobile station; the second mobile station requests the network for a second IP address via a second PDP context activation procedure according to the message received from the network, and the second IP address is available to a third mobile station before the second mobile station acquires the second IP address in order to save network resources; the first mobile station and the second mobile station updates receiving statuses of the first IP address and the second IP address to the server device according to reception of the first IP address and the second IP address; and the server device actively transmits information of the second IP address to the first mobile station after the receiving statuses updated by the first mobile station and the second mobile station indicates that the first mobile station has obtained the first IP address and the second mobile station has obtained the second IP address, to allow the first mobile station to establish the P2P transmission with the second mobile station accordingly.

5. The mobile communication system of claim 4, wherein the first mobile station terminates establishing of the P2P transmission with the second mobile station when the first mobile station fails to transmit the message to the second mobile station, or fails to obtain the first IP address, or fails to receive the information of the second IP address outputted by the server device within a predefined time.

6. The mobile communication system of claim 4, wherein the message transmitted by the first mobile station is a short message.

* * * * *